(12) United States Patent
Yamamoto

(10) Patent No.: US 11,586,404 B2
(45) Date of Patent: Feb. 21, 2023

(54) JOB PROCESSING SYSTEM

(71) Applicant: KYOCERA Document Solutions Inc., Osaka (JP)

(72) Inventor: Yuki Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/616,019

(22) PCT Filed: Jun. 18, 2020

(86) PCT No.: PCT/JP2020/023875
§ 371 (c)(1),
(2) Date: Dec. 3, 2021

(87) PCT Pub. No.: WO2020/262178
PCT Pub. Date: Dec. 30, 2020

(65) Prior Publication Data
US 2022/0253259 A1 Aug. 11, 2022

(30) Foreign Application Priority Data
Jun. 28, 2019 (JP) .............................. JP2019-121755

(51) Int. Cl.
*G06F 3/12* (2006.01)
(52) U.S. Cl.
CPC .......... *G06F 3/1263* (2013.01); *G06F 3/1203* (2013.01); *G06F 3/1267* (2013.01); *G06F 3/1274* (2013.01)

(58) Field of Classification Search
CPC .... G06F 3/1263; G06F 3/1268; G06F 3/1267; G06F 3/1273; G06F 3/1274
USPC ................................. 358/1.15, 1.16; 710/54
See application file for complete search history.

(56) References Cited

U.S. PATENT DOCUMENTS

2007/0046994 A1* 3/2007 Morales .................. G06F 3/126
358/1.16

FOREIGN PATENT DOCUMENTS

JP 2018-111261 A 7/2018

* cited by examiner

*Primary Examiner* — Jamares Q Washington
(74) *Attorney, Agent, or Firm* — IP Business Solutions, LLC

(57) ABSTRACT

A job processing system includes a host computer and an image forming apparatus connected via a network with each other, the host computer includes a job register acceptor that accepts a job register and a communication device that sends the job register to the image forming apparatus, the image forming apparatus includes a display controller and a job execution controller, the job execution controller controls sequential execution of a plurality of jobs shown in the changed job register in accordance with an execution order of the plurality of jobs, and the display controller keeps from making an update to cause a display of the changed job register immediately after a network interface device receives the changed job register, but makes an update to cause a display of the changed job register when a predetermined display updating condition is achieved after the receipt of the changed job register.

7 Claims, 11 Drawing Sheets

JOB PROCESSING SYSTEM

TECHNICAL FIELD

The present invention relates to a job processing system including an information processing apparatus and an image forming apparatus connected via a network with each other, and particularly relates to a technique for updating the display of a job register showing a plurality of jobs and the execution order of the jobs on both the information processing apparatus and the image forming apparatus.

BACKGROUND ART

In recent years, there has been developed a job processing system which includes a host computer and an image forming apparatus connected via a network with the host computer and in which the host computer accepts a job register showing a plurality of jobs and the execution order of the plurality of jobs and the image forming apparatus sequentially executes the plurality of jobs shown in the job register sent from the host computer in accordance with the execution order.

CITATION LIST

Patent Literature

Patent Literature 1: JP-A-2018-111261

SUMMARY OF INVENTION

Technical Problem

However, in a general job processing system, if, while the image forming apparatus executes a large number of jobs shown in a job register from the host computer, the host computer frequently changes the settings, the execution order or so on of the jobs in the job register, a display device of the image forming apparatus involves an update each time such contents of the job register change. Thus, the image forming apparatus bears a large processing burden for display updates, so that the display updates on the image forming apparatus do not occur in time, which presents a problem that the progress of jobs cannot be confirmed or a problem that cancellation or other processing of jobs cannot be performed.

If, instead, in order to reduce the processing burden, the display device of the image forming apparatus is configured not to display the progress of jobs, how the jobs from the host computer are going cannot be seen on the display device of the image forming apparatus, so that confirmation of the progress of jobs and job cancellation cannot be performed. Therefore, it is necessary to display the progress of jobs in a job register in real time also on the display device of the image forming apparatus.

The Patent Literature 1 described above further describes a system which includes a server and an image forming apparatus connected via a network with each other and in which a set of update information on respective icons and label names associated with applications is acquired only in the current language being displayed on the home screen of the image forming apparatus and the display of the icons and label names is updated based on the acquired update information, thus making the time to update the display of the icons and label names shorter than in the case where the display of the icons and label names of the applications is updated after the acquisition of respective corresponding sets of update information in a plurality of languages. However, in the system described in Patent Literature 1, if the computer frequently changes the settings, the execution order or so on of jobs in a job register, the processing burden for display updates of the job register on the image forming apparatus cannot be reduced.

The present invention has been made in view of the foregoing circumstances and has an object of enabling reduction in processing burden for display updates on the image forming apparatus and enabling provision of the progress of jobs in a job register in real time on both the information processing apparatus and the image forming apparatus.

Solution to Problem

A job processing system according to an aspect of the present invention is a job processing system which includes an information processing apparatus and an image forming apparatus connected via a network with each other and in which a job sent from the information processing apparatus is processed on the image forming apparatus, wherein the information processing apparatus includes: an operation device operable by a user; a job register acceptor that accepts a job register showing a plurality of jobs and an execution order of the plurality of jobs in accordance with an operation of the user on the operation device; and a first sending device that sends the job register accepted by the job register acceptor to the image forming apparatus, wherein the image forming apparatus includes: a second receiving device that receives the job register sent from the first sending device; a display device; a display controller that allows the display device to display the plurality of jobs and the execution order of the plurality of jobs shown in the job register received by the second receiving device; a job execution controller that controls sequential execution of the plurality of jobs shown in the job register in accordance with the execution order of the plurality of jobs; and a second sending device that, upon completion of execution of a job under control of the job execution controller, sends a completion notification indicating the completion of the job to the information processing apparatus, wherein, upon the completion of execution of the job under control of the job execution controller, the display controller allows the display device to eliminate display of the completed job, wherein the information processing apparatus further includes a first receiving device that receives the completion notification, wherein the job register acceptor deletes from the job register the completed job indicated by the completion notification received by the first receiving device, wherein when, after the sending of the job register, the job register acceptor accepts a change in contents of the sent job register in accordance with an operation of the user on the operation device, the first sending device of the information processing apparatus sends the changed job register to the image forming apparatus, wherein the job execution controller controls sequential execution of a plurality of jobs shown in the changed job register in accordance with the execution order of the plurality of jobs, wherein immediately after the second receiving device receives the changed job register, the display controller of the image forming apparatus keeps from making an update to cause a display of the changed job register, and wherein when a predetermined display updating condition is achieved after the receipt of the changed job register, the display controller makes an update to cause a display of the changed job register.

Advantageous Effects of Invention

The present invention enables reduction in processing burden for display updates on the image forming apparatus and enables provision of the progress of jobs in a job register in real time on both the information processing apparatus and the image forming apparatus.

DESCRIPTION OF EMBODIMENTS

Figure 1:
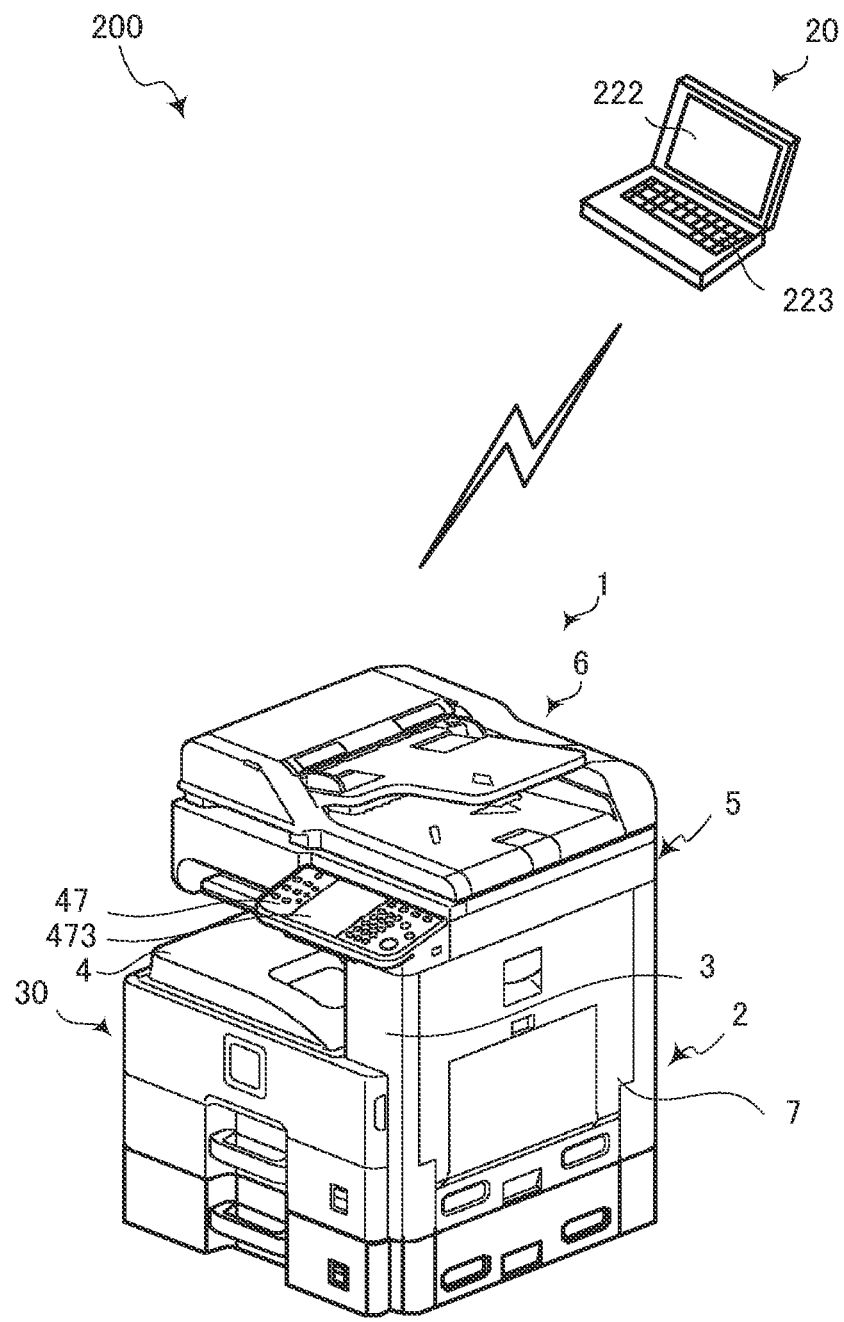
FIG. 1 is a view showing a job processing system according to a first embodiment of the present invention.

Hereinafter, a description will be given of a job processing system according to an embodiment of the present invention with reference to the drawings. FIG. 1 is a view showing a job processing system according to a first embodiment of the present invention. The job processing system 200 according to the first embodiment is, as shown in FIG. 1, a system that includes: a host computer 20 as an example of the information processing apparatus; and an image forming apparatus 1 connected via a network with the host computer 20.

Figure 2:
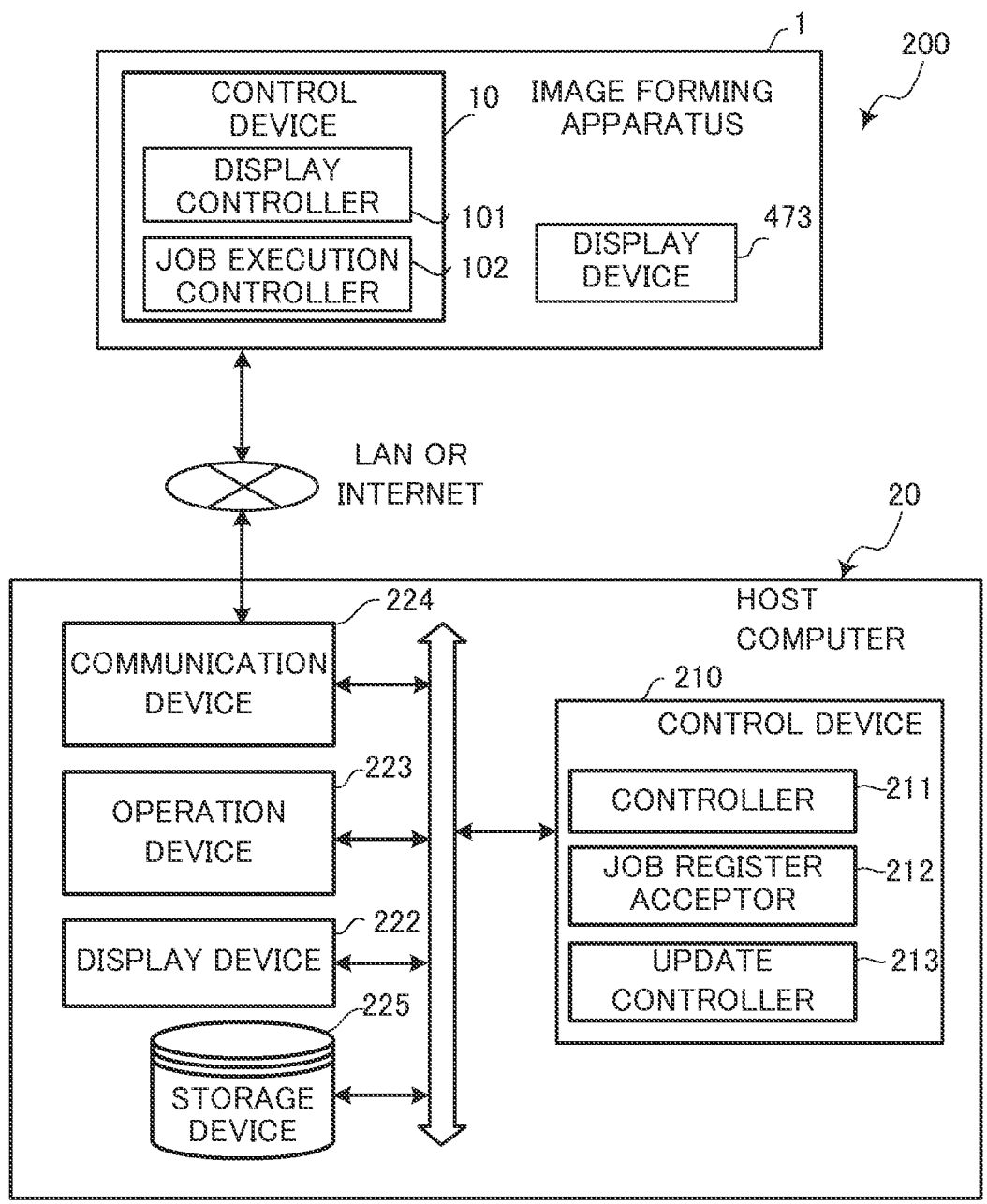
FIG. 2 is a functional block diagram showing an example of an essential internal configuration of a host computer in the first embodiment.

First, a description will be given of the host computer 20 with reference to the drawings. FIG. 2 is a functional block diagram showing an example of an essential internal configuration of the host computer in the first embodiment. The host computer 20 is, for example, a notebook computer and includes a control device 210, a display device 222, an operation device 223, a communication device 224, and a storage device 225. These components are capable of sending and receiving data or signals via a bus to and from each other. Although the host computer 20 is, for example, a notebook computer, it may be a tablet computer, desktop computer or other types of computers.

The display device 222 is a display device, such as a liquid crystal display (LCD) or an organic EL (OLED: organic light-emitting diode) display.

The operation device 223 is operable by a user. The operation device 223 includes, for example, a keyboard or a touch panel (not shown) disposed in front of the display device 222, through each of which the user makes an operation for a job register showing a plurality of jobs and the execution order of the plurality of jobs.

The communication device 224 is a communication interface including an unshown communication module, such as a LAN chip. The communication device 224 has the function of communicating with the image forming apparatus 1.

The storage device 225 is a storage device, such as an HDD (hard disk drive), capable of storing various types of data. The storage device 225 stores, for example, a job register.

The control device 210 is made up of a processor, a RAM (random access memory), a ROM (read only memory), and so on. The processor is a CPU (central processing unit), an MPU (micro-processing unit), an ASIC (application specific integrated circuit) or the like.

The control device 210 includes a controller 211, a job register acceptor 212, and an update controller 213.

When a first control program stored in the storage device 225 is executed by the above processor, the control device 210 functions as the controller 211, the job register acceptor 212, and the update controller 213. However, each of the above components of the control device 210 may not be implemented by the operation of the control device 210 in accordance with the above first control program, but may be constituted by a hardware circuit.

The controller 211 governs the overall operation control of the host computer 20.

The job register acceptor 212 accepts, in accordance with a user's operation on the operation device 223, a job register showing a plurality of jobs and the execution order of the plurality of jobs.

The communication device 224 sends the job register accepted by the job register acceptor 212 to the image forming apparatus 1. The communication device 224 is an example of a first sending device defined in Claims.

Next, a description will be given of the image forming apparatus 1 with reference to the drawings. The image forming apparatus 1 is, for example, a multifunction peripheral having multiple functions, including a copy function, a print function, a scan function, and a facsimile function.

As shown in FIG. 1, the image forming apparatus 1 is made up of an apparatus body 2, an image reading device 5 disposed above the apparatus body 2, and a connecting portion 3 provided between the image reading device 5 and the apparatus body 2.

A housing 7 forming a shell of the image forming apparatus 1 contains a plurality of components for implementing various functions of the image forming apparatus 1. For example, the housing 7 contains the image reading device 5, an image forming device 12 (FIG. 3), a fixing device (FIG. 3), a sheet feed device 30, and so on.

The image reading device 5 is an ADF (auto document feeder) including a document conveyance device 6 and a scanner that optically reads original documents being conveyed by the document conveyance device 6 or an original document placed on an unshown original glass plate. In an image reading operation of the image forming apparatus 1, the image reading device 5 reads original documents being conveyed by the document conveyance device 6 or an original document placed on the unshown original glass plate on a document-by-document basis to acquire images of the original documents.

The image forming device 12 includes a photosensitive drum, a charging device, an exposure device, a developing device, and a transfer device and forms (prints) an image on a recording paper sheet fed from the sheet feeding device 30, using an image read by the image reading device 5 or print data sent from the network-connected host computer 20 or other facsimile devices. The recording paper sheet on which the image has been formed is subjected to fixation processing by the fixing device 13 and then discharged to a sheet output tray 4.

An operation device 47 is operable by a user. The operation device 47 includes, for example, a Start key for instructing execution of any function executable on the image forming apparatus 1, an Enter key for settling the operation of the user (operator), numerical entry keys for entering numerical values, and so on.

The operation device 47 further includes a display device 473 on which operation guidance and so on for the user are displayed. The display device 473 is a display device equipped with a touch panel. The user can operate the image forming apparatus 1 with a touch of an image or an icon displayed on the display device 473.

Figure 3:
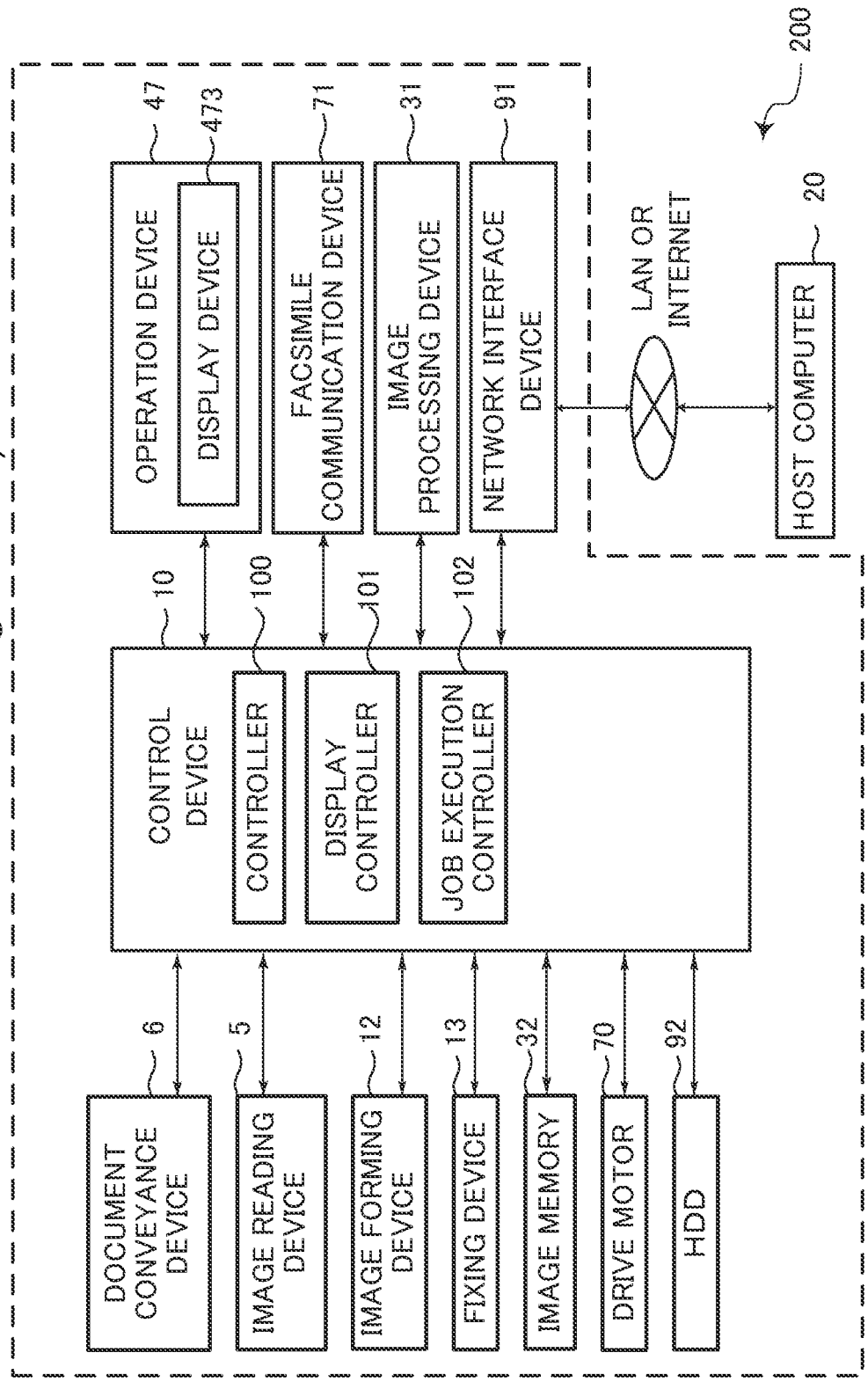
FIG. 3 is a functional block diagram showing an example of an essential internal configuration of an image forming apparatus in the first embodiment.

Next, a description will be given of the configuration of the image forming apparatus 1. FIG. 3 is a functional block diagram showing an example of an essential internal configuration of the image forming apparatus in the first embodiment.

The image forming apparatus 1 includes a control device 10. The control device 10 is made up of a processor, a RAM (random access memory), a ROM (read only memory), and so on. The processor is a CPU (central processing unit), an MPU (micro-processing unit), an ASIC (application specific integrated circuit) or the like.

The image reading device 5 is under control of the control device 10 and includes a reader including a lighting part, a CCD sensor, and so on. The image reading device 5 irradiates an original document with light from the lighting part and receives light reflected from the original document on the CCD sensor, thus reading an image from the original document.

An image processing device 31 subjects a document image read by the image reading device 5 to image processing as necessary. For example, in order that the image read by the image reading device 5 will be improved in quality after being formed into an image by the image forming device 12, the image processing device 31 performs predetermined image processing, such as shading correction.

An image memory 32 provides a region that temporarily stores a document image acquired by reading by the image reading device 5 and temporarily saves an image to be subjected to image formation by the image forming device 12.

The image forming device 12 forms an image from a document image read by the image reading device 5, print data received from the network-connected host computer 20, or other data.

The fixing device 13 performs fixation processing for heating a recording paper sheet having an image (toner image) formed thereon by image formation processing by the image forming device 12 and fixing the image on the recording paper sheet by application of heat and pressure.

The operation device 47 accepts instructions from a user for various actions and processing executable by the image forming apparatus 1. The operation device 47 includes a display device 473 on which operation guidance and so on for the user are displayed.

A facsimile communication device 71 includes a coding/decoding device, a modulation/demodulation device, and an NCU (network control unit), all of which are not illustrated, and performs facsimile communication using a public telephone network.

A network interface device 91 is constituted by a communication module, such as a LAN board, and transfers various data via a LAN or the like connected to the network interface device 91 to and from the host computer 20. Furthermore, the network interface device 91 receives print data from the host computer 20. Particularly, the network interface device 91 receives a job register sent from the host computer 20. The network interface device 91 is an example of a second receiving device defined in Claims.

An HDD (hard disk drive) 92 is a large storage device for use in storing various types of data, programs, document images read by the image reading device 5, and so on.

A drive motor 70 is a drive source that apples a rotary drive force to various rotary members of the image forming device 12, the fixing device 13, and so on, a conveyance roller pair, and other rotary members.

The control device 10 includes a controller 100, a display controller 101, and a job execution controller 102.

When a second control program stored in the HDD 92 is executed by the above processor, the control device 10 functions as the controller 100, the display controller 101, and the job execution controller 102. However, each of the above components of the control device 10 may not be implemented by the operation of the control device 10 in accordance with the above second control program, but may be constituted by a hardware circuit.

The controller 100 governs the overall operation control of the image forming apparatus 1. Furthermore, the controller 100 is connected to the image reading device 5, the document conveyance device 6, the image processing device 31, the image memory 32, the image forming device 12, the fixing device 13, the operation device 47, the display device 473, the facsimile communication device 71, the network interface device 91, the HDD (hard disk drive) 92, and so on and controls the operations of these components.

The display controller 101 allows the display device 473 to display a plurality of jobs and the execution order of the plurality of jobs, which are shown in a job register received by the network interface device 91.

The job execution controller 102 controls sequential execution of the plurality of jobs shown in the job register in accordance with the execution order of the plurality of jobs.

Upon completion of execution of a job under control of the job execution controller 102, the network interface device 91 sends a completion notification indicating the completion of execution of the job to the host computer 20. The network interface device 91 is an example of a second sending device defined in Claims.

Upon completion of execution of a job under control of the job execution controller 102, the display controller 101 allows the display device 473 to eliminate the display of the completed job.

In the meantime, the communication device 224 of the host computer 20 receives the above completion notification. The communication device 224 is an example of a first receiving device defined in Claims.

The job register acceptor 212 deletes from the job register the completed job indicated by the completion notification received by the communication device 224.

When, after the sending of the job register, the job register acceptor 212 accepts a change in contents of the sent job register in accordance with a user's operation on the operation device 223, the communication device 224 of the host computer 20 sends the changed job register to the image forming apparatus 1. For example, the job register acceptor 212 accepts, in accordance with a user's operation on the operation device 223, at least one of a change in the execution order of the jobs and a change in job setting as a change in contents of the sent job register. The following description in this embodiment will be given under the assumption that a change in the execution order of the jobs has been accepted as a change in contents of the job register.

The job execution controller 102 controls sequential execution of the plurality of jobs shown in the changed job register in accordance with the execution order of the plurality of jobs.

Even when the network interface device 91 receives the changed job register, the display controller 101 of the image forming apparatus 1 keeps from making an update to cause a display of the changed job register at the time of receipt of the changed job register. Instead of this, when a predetermined display updating condition is achieved after the receipt of the changed job register, the display controller 101 makes an update to cause a display of the changed job register.

When the execution of a specific job given by specification information is completed, the display controller 101 of the image forming apparatus 1 considers the predetermined display updating condition to have been achieved and makes an update to cause a display of the changed job register.

A description will be given in further detail below of the achievement of the predetermined display updating condition. When, within a period from the sending of a job register by the communication device 224 to the completion of all the jobs relating to the job register, the job register acceptor 212 accepts a change in contents of the sent job register (for example, a change in the execution order of the jobs) in accordance with a user's operation on the operation device 223, the update controller 213 of the host computer 20 allows the communication device 224 to send to the image forming apparatus 1 specification information specifying a specific job of the plurality of jobs in the changed job register.

Specifically, the update controller 213 identifies as a specific job, among the plurality of jobs in the changed job register, at least first preceding job of a job after the change nearest to the last job in the execution order shown in the changed job register and allows the communication device 224 to send specification information specifying the identified specific job to the image forming apparatus 1.

When the execution of the specific job given by the specification information is completed, the display controller 101 of the image forming apparatus 1 considers the predetermined display updating condition to have been achieved and makes an update to cause a display of the changed job register.

Next, a description will be given of job registration execution processing in the job processing system 200 according to the first embodiment with reference to the drawings.

Figure 4:
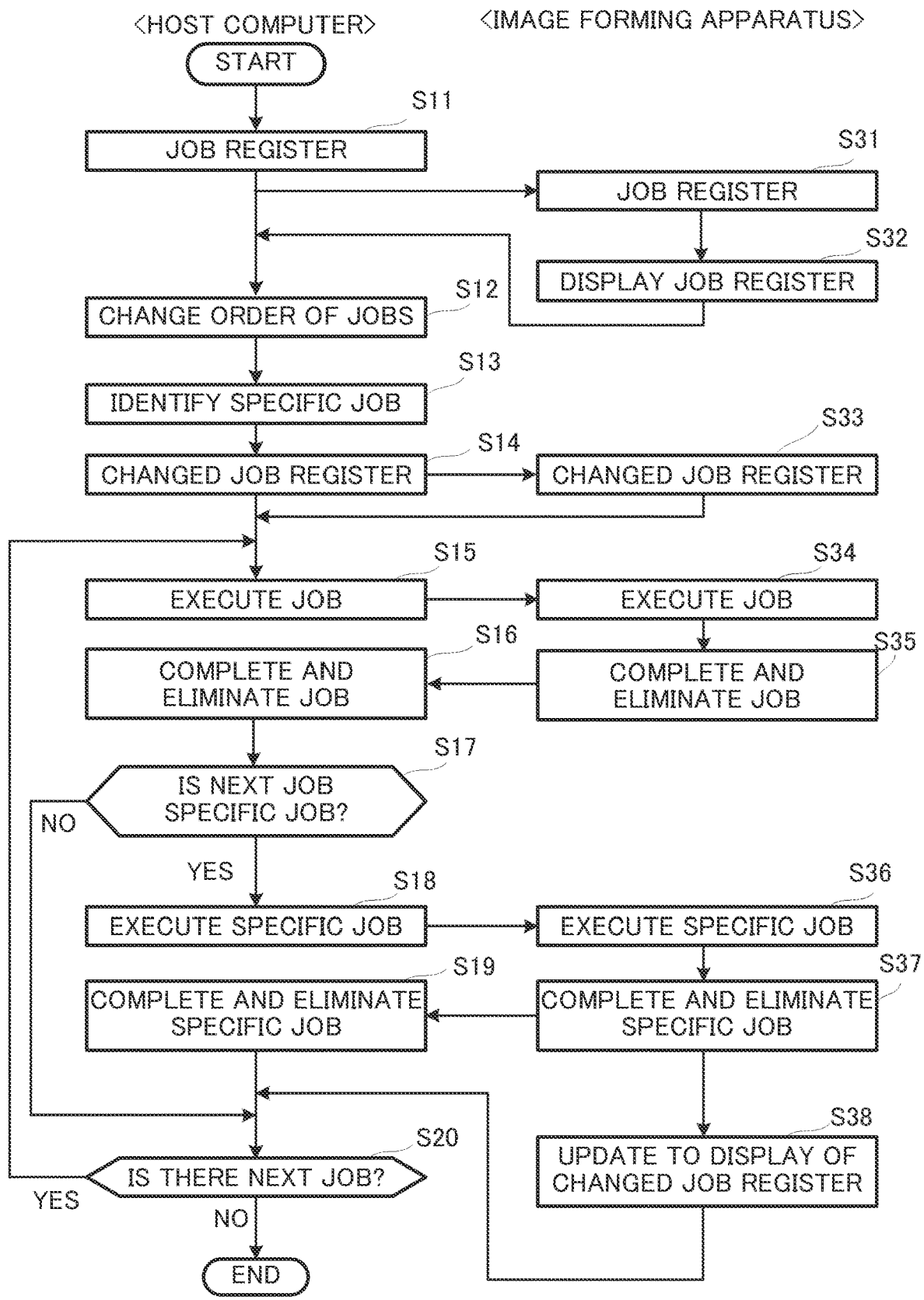
FIG. 4 is a flowchart showing an example of job registration execution processing in the job processing system according to the first embodiment.
Figure 5A:
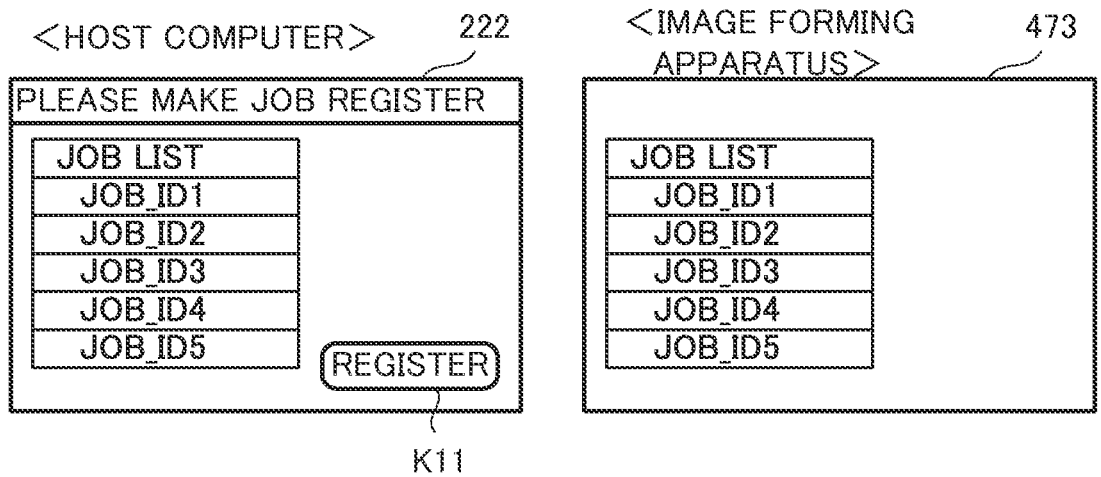
FIG. 5A is a view showing an example of respective display screens of the host computer and the image forming apparatus during the job registration execution processing.
Figure 5B:
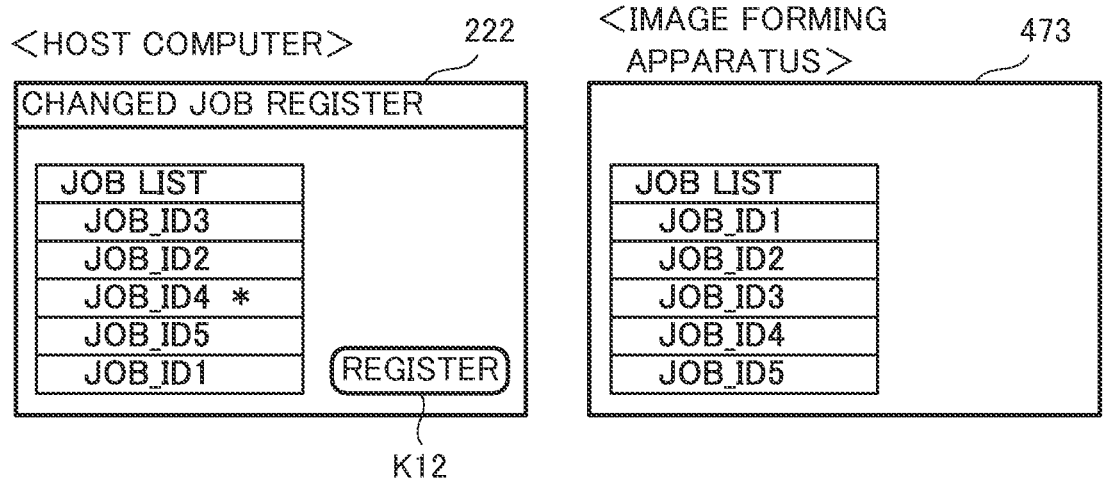
FIG. 5B is a view showing an example of respective display screens of the host computer and the image forming apparatus during the job registration execution processing.
Figure 5C:
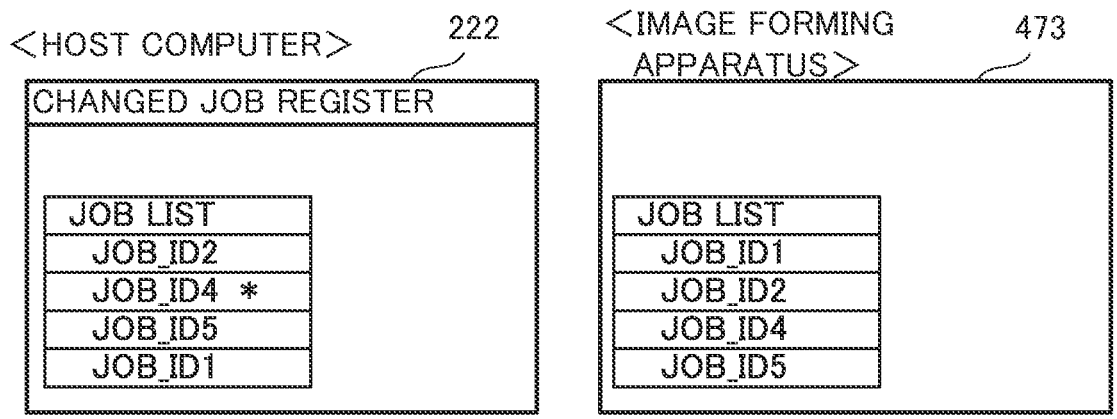
FIG. 5C is a view showing an example of respective display screens of the host computer and the image forming apparatus during the job registration execution processing.
Figure 6A:
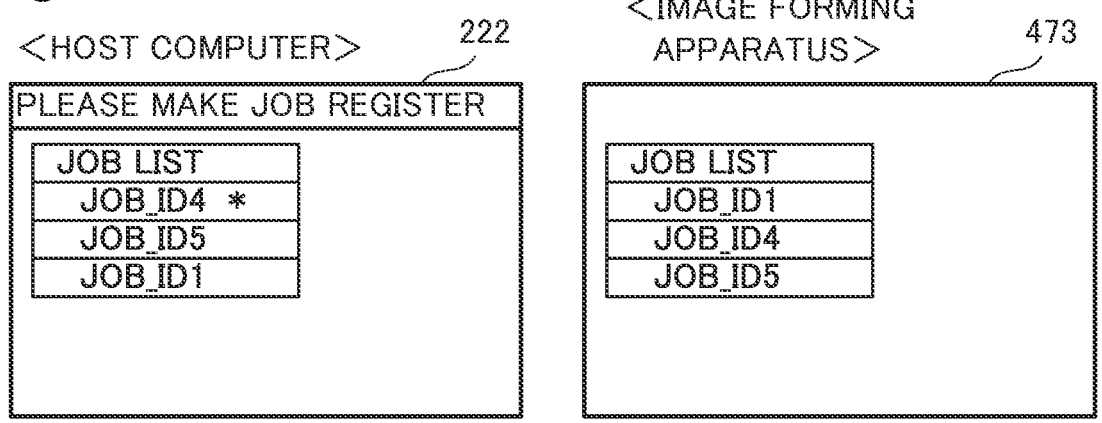
FIG. 6A is a view showing an example of respective display screens of the host computer and the image forming apparatus during the job registration execution processing.
Figure 6B:
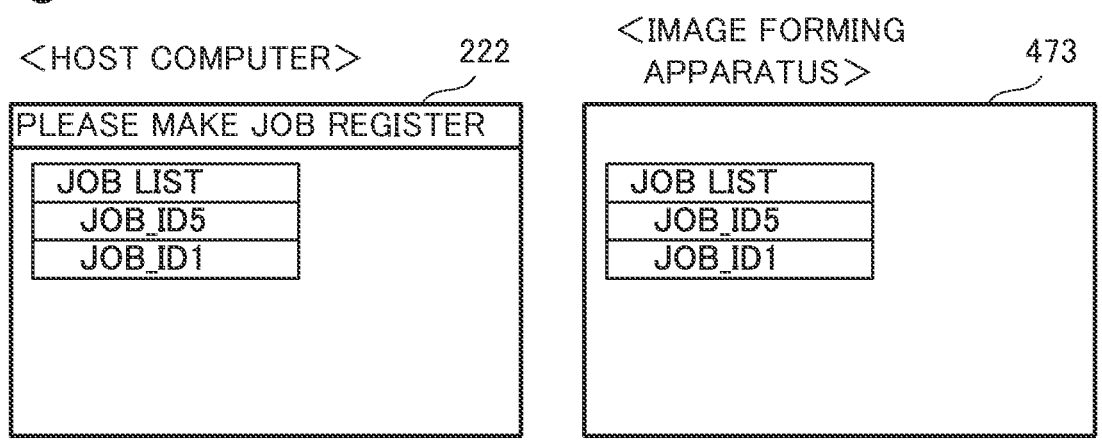
FIG. 6B is a view showing an example of respective display screens of the host computer and the image forming apparatus during the job registration execution processing.

FIG. 4 is a flowchart showing an example of job registration execution processing in the job processing system according to the first embodiment. FIGS. 5A to 5C are views each showing an example of respective display screens of the host computer and the image forming apparatus during the job registration execution processing. FIGS. 6A and 6B are views each showing an example of respective display screens of the host computer and the image forming apparatus during the job registration execution processing.

First, the job register acceptor 212 of the host computer 20 accepts a job register showing a plurality of jobs and the execution order of the plurality of jobs in accordance with a user's operation on the operation device 223 (S11). In this example, in the user's operation on the operation device 223, "JOB List" which is a job register is displayed on the display device 222 as shown in FIG. 5A. In the "JOB List" shown in FIG. 5A, five jobs "JOB_ID1", "JOB_ID2", "JOB_ID3", "JOB_ID4", and "JOB_ID5" are arranged in this order as the execution order. Although in this example all the five jobs are print jobs, the job register may contain various types of jobs other than a print job, including a FAX transmission job and a scan job.

Then, when the user makes a touch gesture on a Register key K11 displayed on the display device 222, the job register acceptor 212 accepts a registration of "JOB List" shown in FIG. 5A and the job register is stored in the storage device 225. The communication device 224 of the host computer 20 sends the job register accepted by the job register acceptor 212 to the image forming apparatus 1.

Then, the network interface device 91 of the image forming apparatus 1 receives the job register sent from the communication device 224 of the host computer 20. The controller 100 registers the job register in the HDD 92 (S31). As shown in FIG. 5A, the display controller 101 allows the display device 473 to display the plurality of jobs and the execution order of the plurality of jobs, which are shown in the job register received by the network interface device 91 (S32). Then, the network interface device 91 of the image forming apparatus 1 sends, under control of the controller 100, a signal indicating that the job register has been registered to the communication device 224 of the host computer 20.

When, after the job register is sent from the host computer 20 to the image forming apparatus 1 and before the execution of any job relating to the job register is completed (before the execution of all the jobs in the job register is completed at the latest), the user accepts a change in contents of the job register (for example, a change in the execution order of the jobs), the controller 211 of the host computer 20 changes the order of the jobs in accordance with the acceptance (S12). In this example, as shown in FIG. 5B, "JOB List" which is a changed job register is displayed on the display device 222 by a user's operation on the operation device 223. The changed "JOB List" shown in FIG. 5B has a following changed execution order: "JOB_ID3", "JOB_ID2", "JOB_ID4", "JOB_ID5", and "JOB_ID1".

Subsequently, the update controller 213 identifies as a specific job, among the plurality of jobs in the changed job register, at least first (second in this example) preceding job ("JOB_ID4" in this example) of a job after the change ("JOB_ID1" in this example) nearest to the last job ("JOB_ID1" in this example) in the execution order shown in the changed job register (S13). Then, the controller 211 allows the display device 222 to display the identified specific job ("JOB_ID4") with a specific sign (for example, "*") added thereto as shown in FIG. 5B. For example, the specific sign (for example, "*") is displayed in association with the specific job ("JOB_ID4"). Subsequently, when the user makes a touch gesture on a Register key K12 displayed on the display device 222 as shown in FIG. 5B, the job register acceptor 212 accepts "JOB List" which is the changed job register and the changed job register is stored in the storage device 225 (S14).

The communication device 224 of the host computer 20 sends the changed job register to the image forming apparatus 1. The controller 100 of the image forming apparatus 1 registers in the HDD 92 the changed job register received by the network interface device 91 (S33). Furthermore, the update controller 213 allows the communication device 224 to send specification information specifying a specific job ("JOB_ID4" in this example) of the plurality of jobs in the changed job register to the image forming apparatus 1. Then, the network interface device 91 of the image forming apparatus 1 sends, under control of the controller 100, a signal indicating that the job register has been registered to the communication device 224 of the host computer 20.

Although the image forming apparatus 1 has received the changed job register (S33 in FIG. 4), it does not make an update to cause a display of the changed job register at the time of receipt of the changed job register. Therefore, the unchanged job register shown in FIG. 5A remains displayed on the display screen of the display device 473 shown in FIG. 5B.

The communication device 224 of the host computer 20 sends, under control of the controller 211, an execution instruction signal instructing to execute a job to the image forming apparatus 1 (S15). The job execution controller 102 of the image forming apparatus 1 executes, based on the received execution instruction signal, "JOB_ID3" which is the first job in the changed job register (S34).

When the execution of the job is completed by the control of the job execution controller 102, the display controller 101 of the image forming apparatus 1 allows the display device 473 to eliminate the display of the completed job (S35). As shown in FIG. 5C, the display controller 101 eliminates "JOB_ID3" which is the first job in the changed job register from "JOB List" on the display device 473.

When the execution of the job is completed by the control of the job execution controller 102, the controller 100 of the image forming apparatus 1 allows the network interface device 91 to send a completion notification indicating the completion of execution of the job to the host computer 20.

The communication device 224 of the host computer 20 receives the above completion notification. Then, the job register acceptor 212 allows "JOB_ID3", which is a completed job indicated by the completion notification received by the communication device 224, to be deleted from the changed job register (S16). The controller 211 eliminates "JOB_ID3", which is the first job in the changed job register, from "JOB List" on the display device 222.

The controller 211 of the host computer 20 determines whether or not a job to be first executed in the changed job register at the present time is a specific job (S17). In this example, a job to be first executed in the changed job register at the present time is "JOB_ID2" as shown in FIG. 5C, the controller 211 determines that the job to be first executed is not a specific job ("NO" in S17), and the controller 211 then determines whether or not there is a next job to be executed (S20). In this example, there is a next job to be executed ("YES" in S20) and, therefore, the controller 211 returns the processing to S15. Then, in the same manner as in the case of the above-mentioned "JOB_ID3", execution processing for the job "JOB_ID2" is performed (S15, S34, S35, and S16).

On the other hand, when in S17 a job to be first executed in the changed job register at the present time is "JOB_ID4" as shown in FIG. 6A, the controller 211 of the host computer 20 determines that the job to be first executed is a specific job ("YES" in S17) and allows the communication device 224 to send an execution instruction signal instructing to execute the specific job to the image forming apparatus 1 (S18). The job execution controller 102 of the image forming apparatus 1 executes, based on the received execution instruction signal, "JOB_ID4" which is the specific job in the changed job register (S36).

Although the image forming apparatus 1 has already received the changed job register in S33 described above, the predetermined display updating condition has not been achieved, that is, the image forming apparatus 1 has not yet received specification information. Therefore, as shown in FIG. 6A, the display controller 101 keeps from making an update to cause a display of the changed job register and merely eliminates the display of completed jobs. As shown in FIG. 6A, the display of the execution order of the jobs remains unchanged, whereas only the display of completed jobs is eliminated.

When the execution of "JOB_ID4" which is a specific job is completed by the control of the job execution controller 102, the display controller 101 of the image forming apparatus 1 allows the display device 473 to eliminate the display of "JOB_ID4" which is the completed specific job (S37). As shown in FIG. 6B, the display controller 101 eliminates "JOB_ID4", which is the specific job in the changed job register, from "JOB List" on the display device 473.

When the execution of the specific job is completed by the control of the job execution controller 102, the controller 100 of the image forming apparatus 1 allows the network interface device 91 to send a completion notification indicating the completion of execution of the job to the host computer 20.

The communication device 224 of the host computer 20 receives the above completion notification. Then, the job register acceptor 212 allows "JOB_ID4", which is the completed specific job indicated by the completion notification received by the communication device 224, to be deleted from the changed job register (S19). As shown in FIG. 6B, the controller 211 eliminates "JOB_ID4", which is the specific job in the changed job register, from "JOB List" on the display device 222.

Then, when the execution of "JOB_ID4" which is a specific job is completed, the display controller 101 considers the predetermined display updating condition to have been achieved and makes an update to cause a display of the changed job register (S38). As shown in FIG. 6B, the display controller 101 of the image forming apparatus 1 allows the display device 473 to provide a display updated to the changed job register at the present time, i.e., a display where the execution order of the jobs has been changed to first "JOB_ID5" and then "JOB_ID1".

In S20, the controller 211 of the host computer 20 determines whether or not there is a next job to be executed (S20). In this example, the next job is "JOB_ID5", that is, there is a next job to be executed ("YES" in S20), and, therefore, the controller 211 returns the processing to S15. Then, in the same manner as in the cases of the above-mentioned "JOB_ID3" and so on, execution processing for the job "JOB_ID5" is performed (S15, S34, S35, and S16) and execution processing for the job "JOB_ID1" is then performed (S15, S34, S35, and S16).

Then, the controller 211 determines that the job to be first executed is not a specific job ("NO" in S17) and determines whether or not there is a next job to be executed (S20). In this case, there is no next job to be executed ("NO" in S20) and, therefore, the controller 211 ends this processing.

As thus far described, in the first embodiment, as to the job execution processing on the image forming apparatus 1 side, the job execution controller 102 controls sequential execution of the plurality of jobs shown in the changed job register in accordance with the execution order of the plurality of jobs. Therefore, the jobs can be suitably executed in accordance with the changed job register. On the other hand, as to the job display processing on the image forming apparatus 1 side, the display controller 101 keeps from making an update to cause a display of the changed job register immediately after the network interface device 91 receives the changed job register, but the display controller 101 makes an update to cause a display of the changed job register when the predetermined display updating condition is achieved after the receipt of the changed job register. In other words, instead of sequentially updating the display at every change in the job register, the display controller 101 makes an update to cause a display of the changed job register, among all the cases where the job register has been changed, only in the case where the predetermined display updating condition is achieved. Hence, the processing burden for display updates on the image forming apparatus 1 can be reduced. Since, as just described, the processing burden for display updates on the image forming apparatus 1 is reduced, even if the job register has been changed multiple times, confirmation of the progress of the jobs or cancellation of jobs in the job register being displayed on the display device 473 of the image forming apparatus 1 can be performed, so that the performance of the image forming apparatus 1 can be ensured.

Furthermore, upon completion of execution of a job, the second sending device of the image forming apparatus 1 sends a completion notification indicating the completion of execution of the job to the host computer 20 and the display controller 101 of the image forming apparatus 1 allows the display device 473 to eliminate the display of the completed job. The communication device 224 of the host computer 20 receives the completion notification from the image forming apparatus 1. The job register acceptor 212 of the host computer 20 deletes from the job register the completed job indicated by the completion notification received by the communication device 224. Thus, instead of changing the job register, completed jobs in the job register can be appropriately eliminated on the display device 473 of the image forming apparatus 1 and can be appropriately deleted from the job register on the host computer 20. Therefore, on both the host computer 20 and the image forming apparatus 1, the progress of the jobs in the job register can be provided in real time.

As thus far described, the processing burden for display updates on the image forming apparatus 1 can be reduced, the performance of the image forming apparatus 1 can be ensured even if the job register has been changed multiple times, and the progress of the jobs in the job register can be provided in real time on both the host computer 20 and the image forming apparatus 1.

Furthermore, when, after the sending of a job register by the communication device 224, the job register acceptor 212 accepts a change in contents of the sent job register in accordance with a user's operation on the operation device 223, the update controller 213 of the host computer 20 allows the communication device 224 to send to the image forming apparatus 1 specification information specifying a specific job of the plurality of jobs in the changed job register. When the execution of the specific job indicated by specification information is completed, the display controller 101 of the image forming apparatus 1 considers the predetermined display updating condition to have been achieved and makes an update to cause a display of the changed job register. Therefore, a suitable configuration can be provided in which, instead of sequentially updating the display at every change in the job register, the display is updated only in the case where the predetermined display updating condition is achieved.

Moreover, the job register acceptor 212 accepts, in accordance with a user's operation on the operation device 223, a change in the execution order of the jobs as a change in contents of the sent job register. Thus, in the case where, as to the job register, the execution order of the jobs has been changed, the display is not sequentially updated at every change in the job register, but is updated to a display of the changed job register, among all the cases where the job register has been changed, only in the case where the predetermined display updating condition is achieved. Therefore, instead of sequentially updating the display at every change in the job register, the display is updated only in the case where the predetermined display updating condition is achieved. Hence, the processing burden for display updates on the image forming apparatus 1 can be reduced.

Furthermore, when the job register acceptor 212 accepts a change in contents of the sent job register, the update controller 213 identifies as a specific job, among the plurality of jobs in the changed job register, at least first preceding job of a job after the change nearest to the last job in the execution order shown in the changed job register and allows the communication device 224 to send specification information specifying the identified specific job to the image forming apparatus 1. Thus, there is no need for the user to designate a specific job, so that the operation burden on the user can be reduced. Since at least first preceding job of a job after the change nearest to the last job in the execution order shown in the changed job register is identified as a specific job and, upon completion of the execution of the specific job, the display is updated to a display of the job register containing jobs subsequent to the specific job as jobs after the change and the jobs after the change, a display updated to the changed job register can be surely provided. As seen from the above, the operation burden on the user can be reduced and a display updated to the changed job register can be surely provided while the processing burden for display updates can be reduced.

Figure 7:
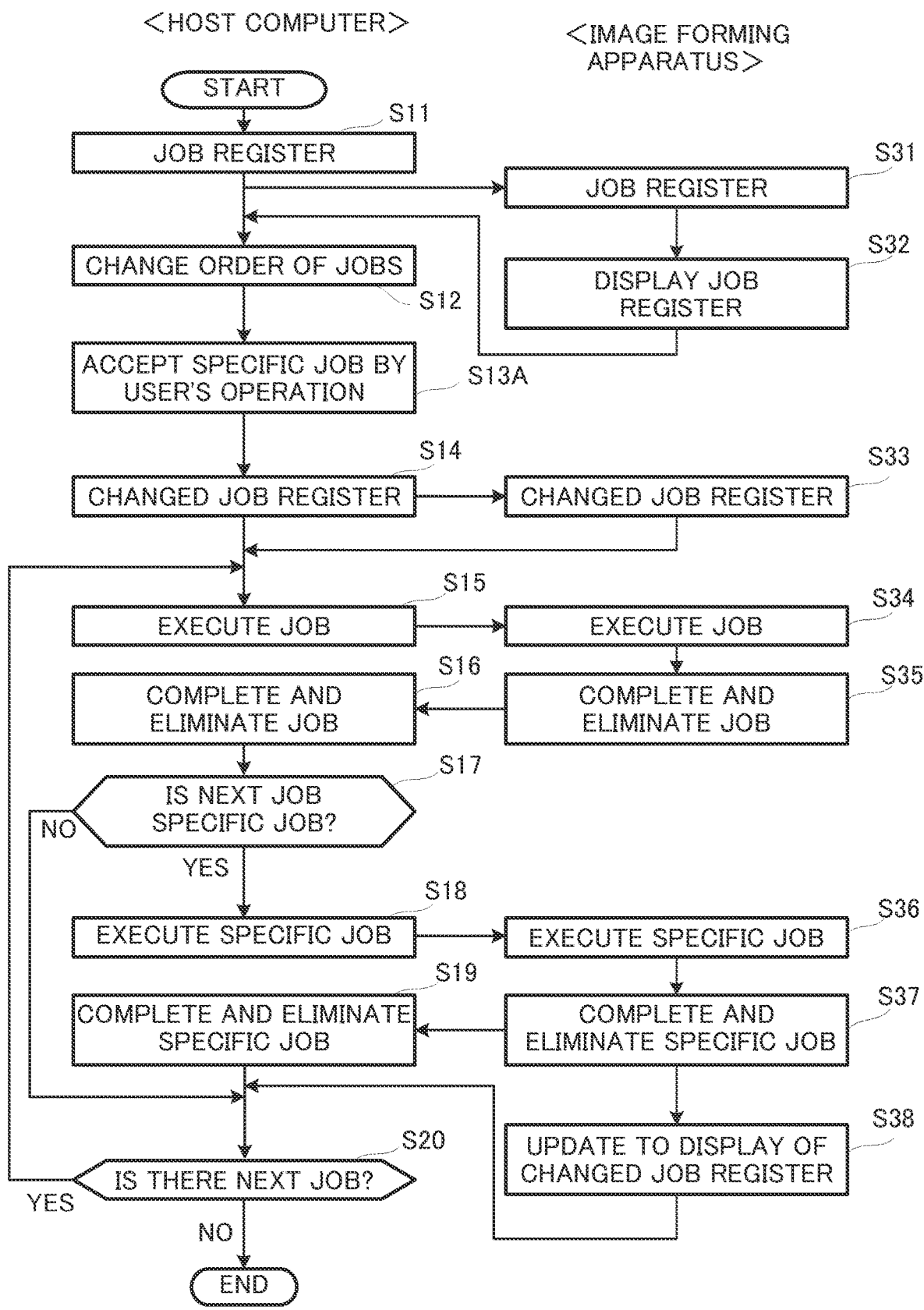
FIG. 7 is a flowchart showing an example of job registration execution processing in a job processing system according to a second embodiment.

Next, a description will be given of a job processing system 200 according to a second embodiment with reference to FIG. 7. FIG. 7 is a flowchart showing an example of job registration execution processing in the job processing system according to the second embodiment.

Although in the first embodiment the update controller 213 identifies a specific job, the second embodiment is different from the above first embodiment in that the update controller 213 accepts a specific job by user's designation. In this relation, a description will be given in detail of the update controller 213 in the second embodiment. The same components as those shown in FIGS. 2 and 3 are designated by the same references and further explanation thereof will be omitted.

When the job register acceptor 212 accepts a change in contents of the sent job register in accordance with a user's operation on the operation device 223, the update controller 213 in the second embodiment accepts as a specific job, among the plurality of jobs in the changed job register, a job designated by the user and allows the communication device 224 to send specification information specifying the accepted specific job to the image forming apparatus 1.

The processing steps other than S13A in FIG. 7 are the same as those in FIG. 4 and, therefore, a description will be given of the processing step in S13A. For example, as shown in FIG. 5B, when, among the plurality of jobs in the changed job register displayed on the display device 222, an arbitrary job ("JOB_ID4" in this example) is designated in accordance with a user's operation on the operation device 223, the update controller 213 accepts the designated job as a specific job (513A). The controller 211 allows the display device 222 to display the identified specific job ("JO-B_ID4") with a specific sign (for example, "*") added thereto as shown in FIG. 5B.

Although the image forming apparatus 1 has received the changed job register (S33 in FIG. 4), it does not make an update to cause a display of the changed job register at the time of receipt of the changed job register. Therefore, the unchanged job register shown in FIG. 5A remains displayed on the display screen of the display device 473 shown in FIG. 5B. This point is the same as with the above first embodiment.

Then, when the execution of "JOB_ID4" which is a specific job is completed, the display controller 101 considers the predetermined display updating condition to have been achieved and makes an update to cause a display of the changed job register (S38 in FIG. 7). As shown in FIG. 6B, the display controller 101 of the image forming apparatus 1 allows the display device 473 to provide a display updated to the changed job register at the present time, i.e., a display where the execution order of the jobs has been changed to first "JOB_ID5" and then "JOB_ID1".

As thus far described, in the second embodiment, when the job register acceptor 212 accepts a change in contents of the sent job register, the update controller 213 accepts a specific job of the plurality of jobs in the changed job register by user's designation and allows the communication device 224 to send the specification information specifying the accepted specific job to the image forming apparatus 1. Thus, the point in time when the display on the image forming apparatus 1 is to be updated can be designated in advance by the user. Therefore, the degree of freedom of display updates on the image forming apparatus 1 can be increased while the processing burden for display updates on the image forming apparatus 1 can be reduced.

Figure 8:
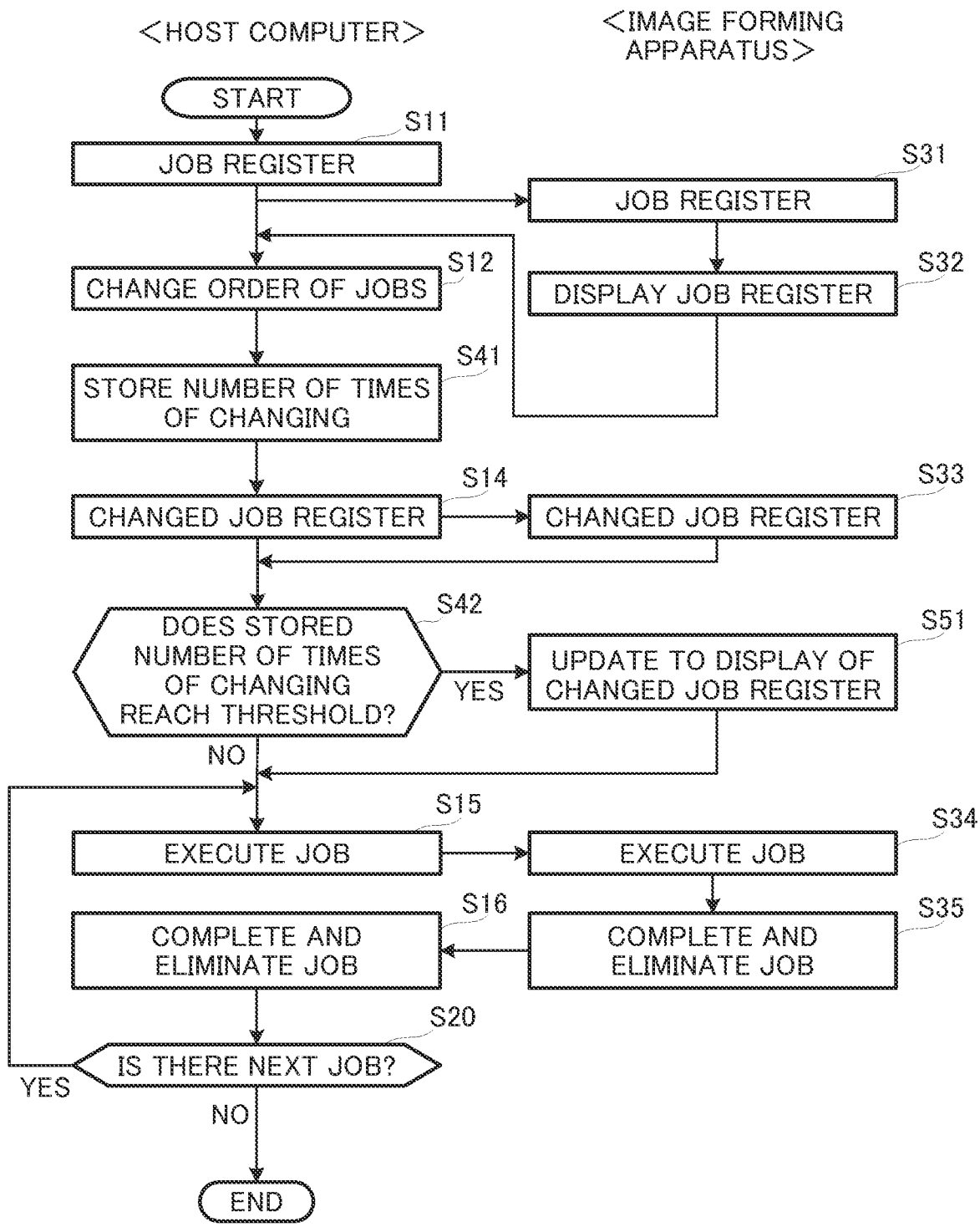
FIG. 8 is a flowchart showing an example of job registration execution processing in a job processing system according to a third embodiment.

Next, a description will be given of a job processing system 200 according to a third embodiment with reference to FIG. 8. FIG. 8 is a flowchart showing an example of job registration execution processing in the job processing system according to the third embodiment.

In the first embodiment, the update controller 213 of the host computer 20 designates a specific job and, upon completion of execution of the designated specific job on the image forming apparatus 1, the display on the display device 473 of the image forming apparatus 1 is updated (specifically, the display is updated to a display of the changed job register). In contrast, the third embodiment is different from the above first embodiment in that, when the number of times that a change in contents of the job register has been accepted reaches a predetermined number of times of changing the job register, the update controller 213 of the host computer 20 allows a display update signal to be sent to the image forming apparatus 1, and that, upon receipt of the display update signal, the image forming apparatus 1 updates the display on the display device 473 (specifically, makes an update to a display of the changed job register). Therefore, a description will be given in detail of the update controller 213 in the third embodiment. The same components as those shown in FIGS. 2 and 3 are designated by the same references and further explanation thereof will be omitted.

In the third embodiment, when, after the sending of a job register by the communication device 224, the number of times that the job register acceptor 212 has accepted a change in contents of the sent job register (a change in the execution order of the jobs in this example) in accordance with a user's operation on the operation device 223 reaches a predetermined number of times (for example, five times) of changing the job register, the update controller 213 of the host computer 20 allows the communication device 224 to send a display update signal to the image forming apparatus 1.

When the network interface device 91 receives the display update signal, the display controller 101 of the image forming apparatus 1 considers the predetermined display updating condition to have been achieved and makes an update to cause a display of the changed job register.

In the job registration execution processing of the job processing system according to the third embodiment shown in FIG. 8, S41 is provided instead of S13 in FIG. 4, S17 to S19 and S36 to S38 in FIG. 4 are deleted, and S42 and S51 are provided. A description will be given below of these processing steps. The update controller 213 allows the HDD 92 to store the number of times that, after the sending of a job register by the communication device 224, the job register acceptor 212 has accepted a change in contents of the sent job register (a change in the execution order of the jobs in this example) in accordance with a user's operation on the operation device 223 (S41).

After the processing in S14, the update controller 213 determines whether or not the number of times that a change in contents of the job register has been accepted reaches a predetermined number of times (for example, five times) of changing the job register (S42). If the predetermined number of times (for example, five times) of changing the job register is reached ("YES" in S42), the update controller 213 allows the communication device 224 to send a display update signal to the image forming apparatus 1.

Then, when the network interface device 91 receives the display update signal, the display controller 101 considers the predetermined display updating condition to have been achieved and makes an update to cause a display of the changed job register (S51 in FIG. 8). The display controller 101 of the image forming apparatus 1 allows the display device 473 to provide a display updated to the changed job register.

As thus far described, in the third embodiment, when, after the sending of a job register by the communication device 224, the number of times that the job register acceptor 212 has accepted a change in contents of the sent job register in accordance with a user's operation on the operation device 223 reaches a predetermined number of times (for example, five times) of changing the job register, the update controller 213 of the host computer 20 allows the communication device 224 to send a display update signal to the image forming apparatus 1. When the network interface device 91 receives the display update signal, the display controller 101 of the image forming apparatus 1 considers the predetermined display updating condition to have been achieved and makes an update to cause a display of the changed job register. Therefore, a suitable configuration can be provided in which, instead of sequentially updating the display at every change in the job register, the display is updated only in the case where the predetermined display updating condition is achieved.

Figure 9:
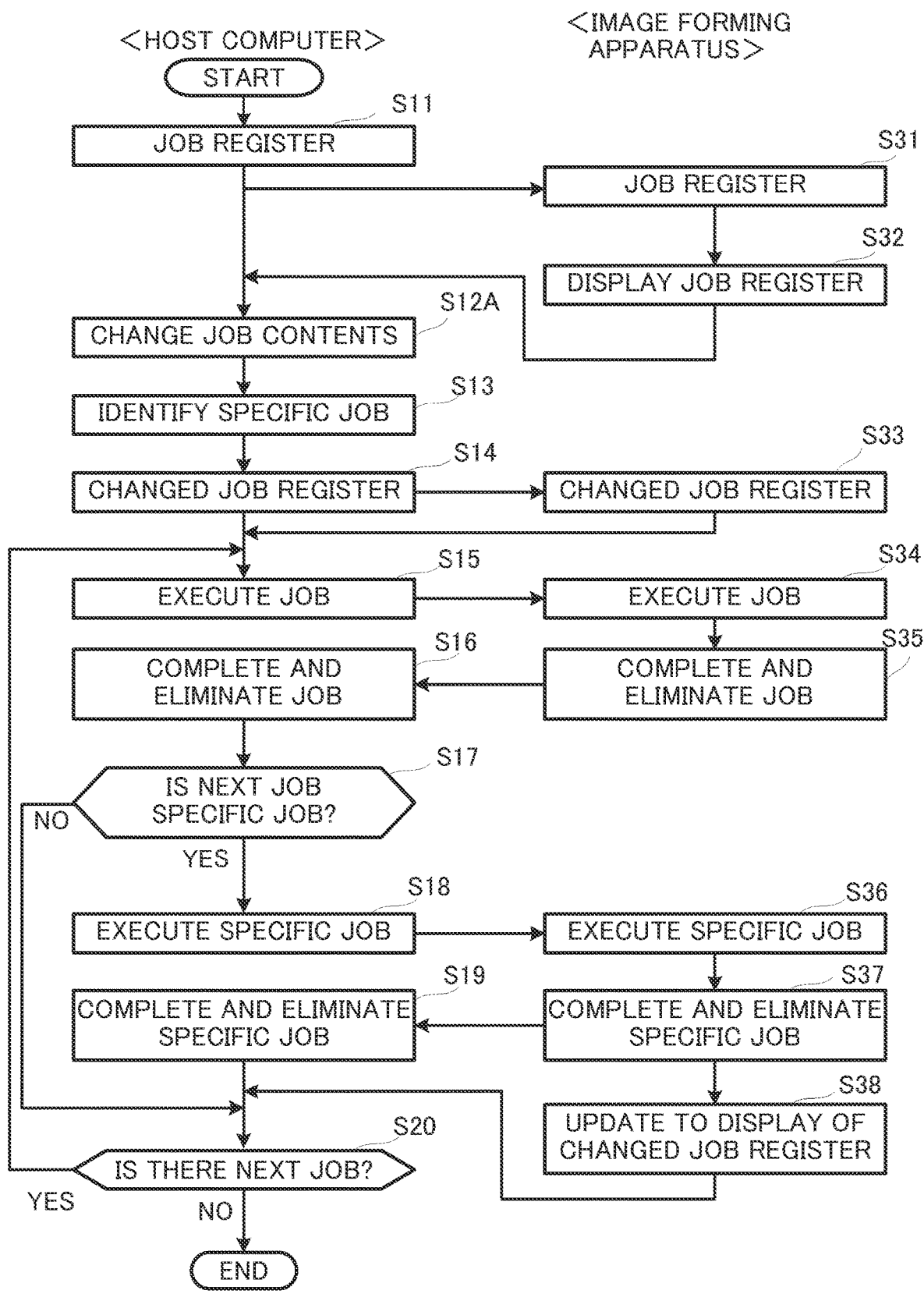
FIG. 9 is a flowchart showing an example of job registration execution processing in a job processing system according to a modification.
Figure 10A:
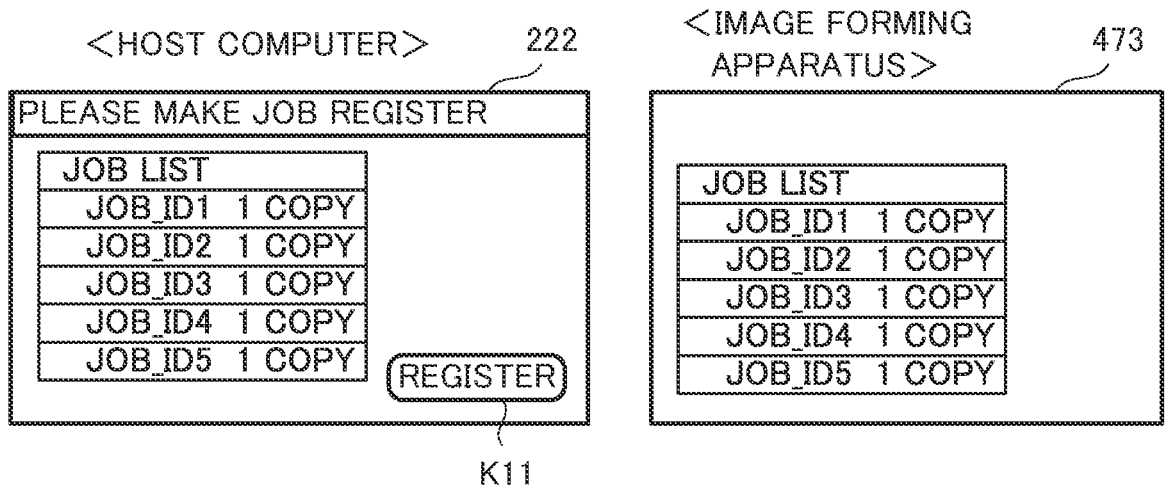
FIG. 10A is a view showing an example of respective display screens of a host computer and an image forming apparatus during the job registration execution processing in the modification.

<Modification> Although in the above embodiments a change in the execution order of the jobs is accepted as a change in contents of the job register, a description will be given, in this modification, of the case where a change in the execution order of the jobs and a change in job setting are accepted as changes in contents of the job register, as shown in FIGS. 9 to 11.

FIG. 9 is a flowchart showing an example of job registration execution processing in a job processing system according to the modification. FIGS. 10A to 10C and FIGS. 11A and 11B are views each showing an example of respective display screens of the host computer and the image forming apparatus during the job registration execution processing in the modification.

The job registration execution processing of the job processing system according to the third embodiment shown in FIG. 9 is different from that according to the first embodiment in that, as shown in FIG. 9, S12A is provided instead of S12 in FIG. 4. A description will be given of the processing step in S12A in FIG. 9.

Figure 10B:
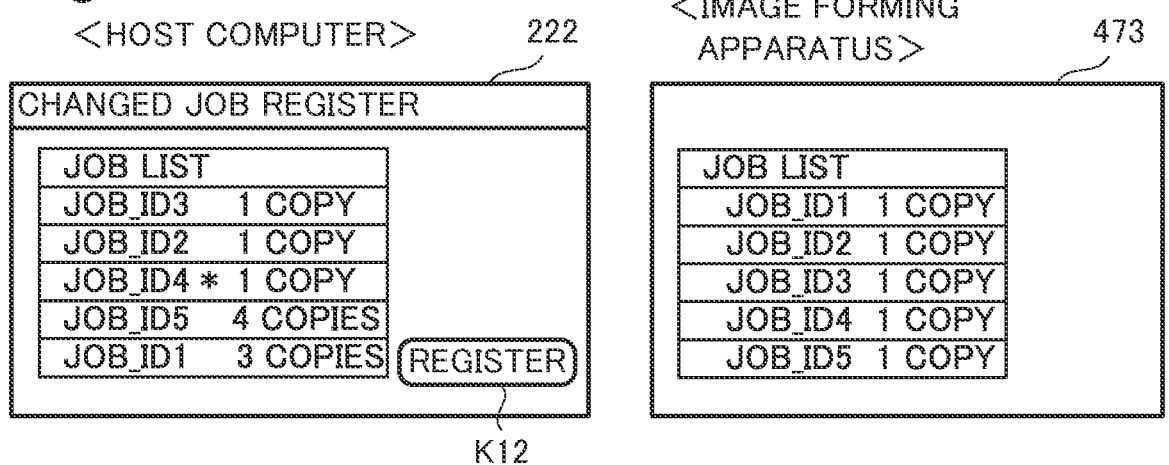
FIG. 10B is a view showing an example of respective display screens of the host computer and the image forming apparatus during the job registration execution processing in the modification.
Figure 10C:
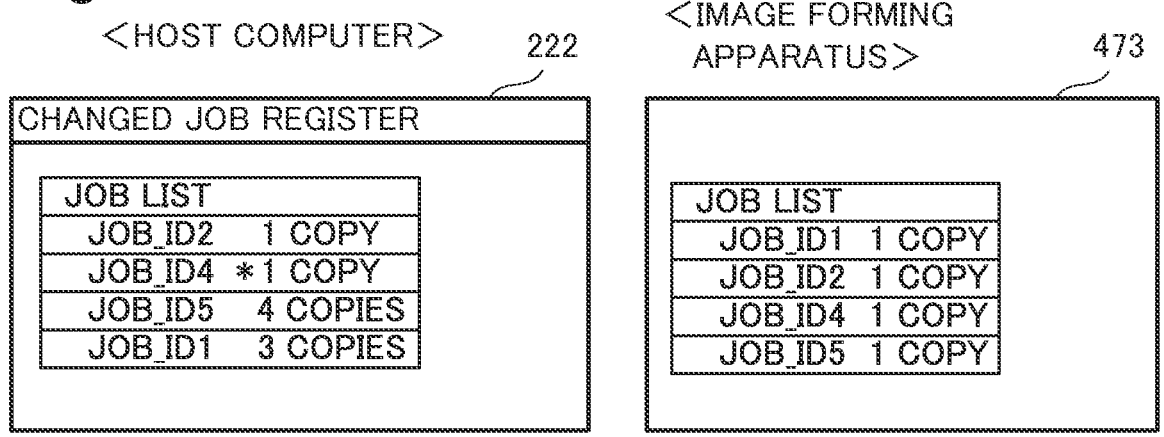
FIG. 10C is a view showing an example of respective display screens of the host computer and the image forming apparatus during the job registration execution processing in the modification.
Figure 11A:
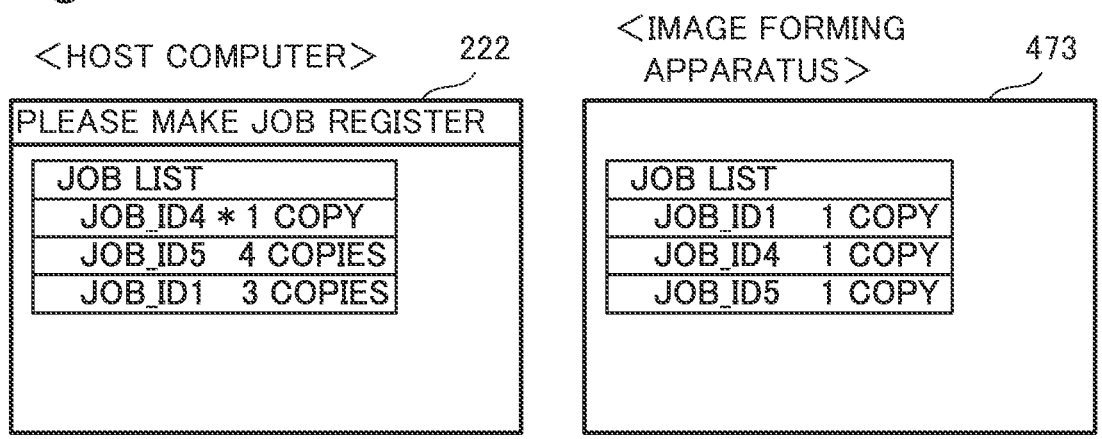
FIG. 11A is a view showing an example of respective display screens of the host computer and the image forming apparatus during the job registration execution processing in the modification.

When, after the job register is sent from the host computer 20 to the image forming apparatus 1 and before the execution of any job relating to the job register is completed (before the execution of all the jobs in the job register is completed at the latest), the user accepts as changes in contents of the job register a change in the execution order of the jobs and a change in job setting, the controller 211 of the host computer 20 changes the contents of the jobs in accordance with the acceptance (512A). In this modification, as shown in FIG. 10B, "JOB List" which is a changed job register is displayed on the display device 222 by a user's operation on the operation device 223. In the changed "JOB List" shown in FIG. 10B, the execution order is changed: "JOB_ID3" first, "JOB_ID2" second, "JOB_ID4" third, "JOB_ID5" fourth, and "JOB_ID1" last, the number of copies printed, which is an example of a job setting, for "JOB_ID3", "JOB_ID2", and "JOB_ID4" remains 1 COPY, the number of copies printed for "JOB_ID5" is changed from 1 COPY to 4 COPIES, and the number of copies printed for "JOB_ID1" is changed from 1 COPY to 3 COPIES.

Although the image forming apparatus 1 has received the changed job register (S33 in FIG. 9), it does not make an update to cause a display of the changed job register at the time of receipt of the changed job register. Therefore, the unchanged job register shown in FIG. 10A remains displayed on the display screen of the display device 473 shown in FIG. 10B.

Figure 11B:
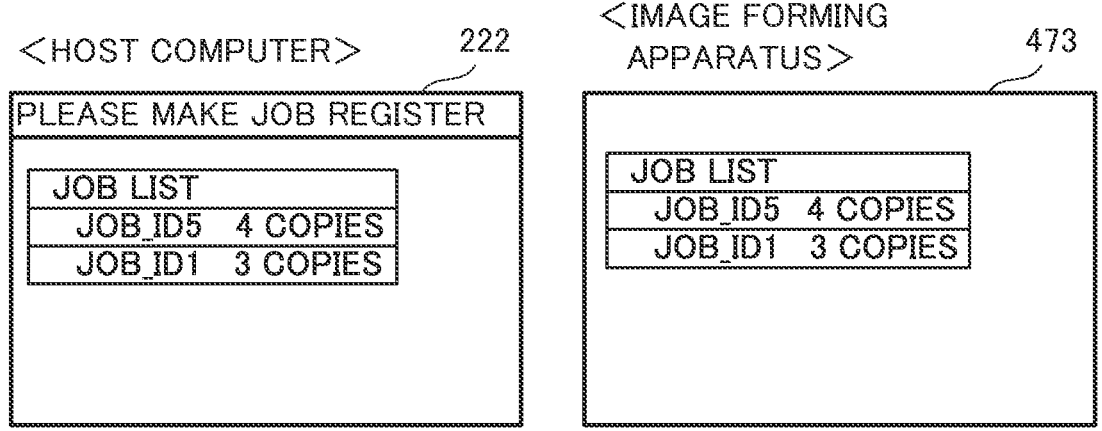
FIG. 11B is a view showing an example of respective display screens of the host computer and the image forming apparatus during the job registration execution processing in the modification.

Then, when the execution of "JOB_ID4" which is a specific job is completed (S37), the display controller 101 considers the predetermined display updating condition to have been achieved and makes an update to cause a display of the changed job register (S38 in FIG. 9). As shown in FIG. 11B, the display controller 101 of the image forming apparatus 1 allows the display device 473 to provide a display updated to the changed job register at the present time, i.e., a display where the execution order of the jobs has been changed to first "JOB_ID5" and then "JOB_ID1" and the respective numbers of copies printed for "JOB_ID5" and "JOB_ID1" are changed to 4 COPIES and 3 COPIES, respectively.

Alternatively, the job register acceptor 212 may accept only a change in job setting as a change in contents of the job register.

In the modification, the job register acceptor 212 accepts, in accordance with a user's operation on the operation device 223, at least one of a change in the execution order of the jobs and a change in job setting as a change in contents of the sent job register. Thus, in the case where, as to the job register, one or both of the execution order of the jobs and job setting have been changed, the display is not sequentially updated at every change in the job register, but is updated to a display of the changed job register, among all the cases where the job register has been changed, only in the case where the predetermined display updating condition is achieved. Therefore, instead of sequentially updating the display at every change in the job register, the display is updated only in the case where the predetermined display updating condition is achieved. Hence, the processing burden for display updates on the image forming apparatus 1 can be reduced.

In the above embodiments and modification, a change in contents of the job register is accepted after the sending of the job register to the image forming apparatus 1 and before the start of execution of the jobs in the job register. However, a change in contents of the job register may be accepted after the start of execution of at least one job in the job register. Thus, the processing burden for display updates on the image forming apparatus 1 can be reduced.

The structures, configurations, and processing described in the above embodiments with reference to FIGS. 1 to 11 are merely illustrative of the present invention and are not intended to limit the present invention to the above structures, configurations, and processing.

The invention claimed is:

1. A job processing system which includes an information processing apparatus and an image forming apparatus connected via a network with each other and in which a job sent from the information processing apparatus is processed on the image forming apparatus, the information processing apparatus comprising:
an operation device operable by a user;
a first control device that includes a processor and, through the processor executing a control program, acts as a job register acceptor that accepts a job register showing a plurality of jobs and an execution order of the plurality of jobs in accordance with an operation of the user on the operation device; and a first sending device that sends the job register accepted by the job register acceptor to the image forming apparatus, the image forming apparatus comprising:

a second receiving device that receives the job register sent from the first sending device;

a display device;

a second control device that includes a processor and, through the processor executing a control program, acts as:

a display controller that allows the display device to display the plurality of jobs and the execution order of the plurality of jobs shown in the job register received by the second receiving device; and a job execution controller that controls sequential execution of the plurality of jobs shown in the job register in accordance with the execution order of the plurality of jobs; and a second sending device that, upon completion of execution of the job under control of the job execution controller, sends a completion notification indicating the completion of the job to the information processing apparatus, wherein, upon the completion of execution of the job under control of the job execution controller, the display controller allows the display device to eliminate display of the completed job, wherein the information processing apparatus further comprises a first receiving device that receives the completion notification, wherein the job register acceptor deletes from the job register the completed job indicated by the completion notification received by the first receiving device, wherein when, after the sending of the job register, the job register acceptor accepts a change in contents of the sent job register in accordance with an operation of the user on the operation device, the first sending device of the information processing apparatus sends the changed job register to the image forming apparatus, wherein the job execution controller controls sequential execution of a plurality of jobs shown in the changed job register in accordance with the execution order of the plurality of jobs, wherein immediately after the second receiving device receives the changed job register, the display controller of the image forming apparatus keeps from making an update to cause a display of the changed job register, and wherein when a predetermined display updating condition is achieved after the receipt of the changed job register, the display controller makes an update to cause a display of the changed job register.

2. The job processing system according to claim 1, wherein the first control device further acts as an update controller that, after the first sending device sends the job register and when the job register acceptor accepts a change in contents of the sent job register in accordance with an operation of the user on the operation device, allows the first sending device to send to the image forming apparatus specification information specifying a specific job of the plurality of jobs in the changed job register, and when execution of the specific job specified by the specification information is completed, the display controller of the image forming apparatus considers the predetermined display updating condition to have been achieved and makes an update to cause a display of the changed job register.

3. The job processing system according to claim 1, wherein the first control device further acts as an update controller that, after the first sending device sends the job register and when a number of times that the job register acceptor has accepted a change in contents of the job register in accordance with an operation of the user on the operation device reaches a predetermined number of times of changing the job register, allows the first sending device to send a display update signal to the image forming apparatus, and when the second receiving device receives the display update signal, the display controller of the image forming apparatus considers the predetermined display updating condition to have been achieved and makes an update to cause a display of the changed job register.

4. The job processing system according to claim 1, wherein the job register acceptor accepts, in accordance with an operation of the user on the operation device, at least one of a change in the execution order of the jobs and a change in job setting as a change in contents of the sent job register.

5. The job processing system according to claim 2, wherein when the job register acceptor accepts a change in contents of the sent job register in accordance with an operation of the user on the operation device, the update controller accepts as the specific job, among the plurality of jobs in the changed job register, a job designated by the user and allows the first sending device to send specification information specifying the accepted specific job to the image forming apparatus.

6. The job processing system according to claim 2, wherein when the job register acceptor accepts a change in contents of the sent job register in accordance with an operation of the user on the operation device, the update controller identifies as the specific job, among the plurality of jobs in the changed job register, at least first preceding job of a job after the change nearest to a last job in the execution order shown in the changed job register and allows the first sending device to send specification information specifying the identified specific job to the image forming apparatus.

7. The job processing system according to claim 5, wherein the information processing apparatus further comprises: a display device for the information processing apparatus, wherein the first control device further acts as a controller that allows the display device for the information processing apparatus to display a specific sign representing the specific job in association with the specific job.

* * * * *